United States Patent
Hegwer

[11] 3,739,548
[45] June 19, 1973

[54] METHOD AND APPARATUS FOR REMOVING DISTILLATE FROM PHYSICAL SOLVENTS

[75] Inventor: Arnold M. Hegwer, Houston, Tex.

[73] Assignee: Fish Engineering & Construction, Inc., Houston, Tex.

[22] Filed: Jan. 28, 1972

[21] Appl. No.: 221,684

[52] U.S. Cl.............................. 55/45, 55/48, 55/68
[51] Int. Cl............................................. B01d 19/00
[58] Field of Search.................... 55/45, 48, 68, 73, 55/171; 210/73, 83, 513, 198

[56] References Cited
UNITED STATES PATENTS

| | | |
|---|---|---|
| 3,225,519 | 12/1965 | Stotler .................................. 55/48 |
| 3,253,390 | 5/1966 | Connors.............................. 55/45 X |
| 3,254,473 | 6/1966 | Fryar et al. .......................... 55/45 X |
| 3,492,788 | 2/1970 | Hochgesand et al. ................. 55/48 |
| 3,542,196 | 11/1970 | Madlung, Jr....................... 55/45 X |

*Primary Examiner*—Samih N. Zaharna
*Assistant Examiner*—R. W. Burks
*Attorney*—Paul E. Harris, Lee R. Larkin, Marcus L. Thompson et al.

[57] ABSTRACT

Water is mixed with a stream of physical solvent used for acid gas removal which contains distillate. The mixture separates into an aqueous phase containing the physical solvent and water and an organic phase containing the distillate. The two phases are separated mechanically and the water and solvent are separated by fractional distillation.

4 Claims, 1 Drawing Figure

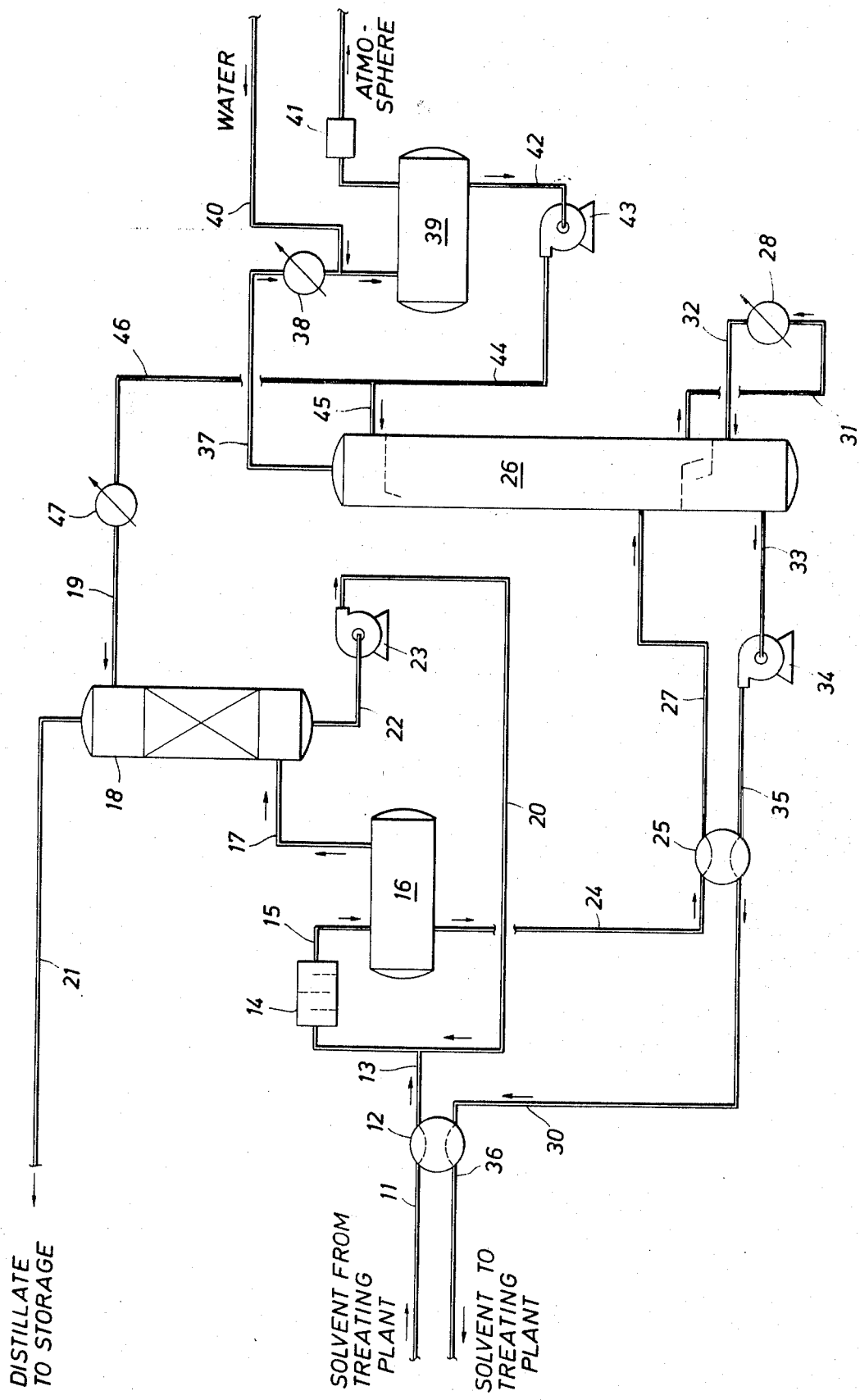

METHOD AND APPARATUS FOR REMOVING DISTILLATE FROM PHYSICAL SOLVENTS

BACKGROUND OF THE INVENTION

1. Field of the Invention

Solvent regeneration methods and apparatus for use in connection with acid gas removal from natural or synthetic gas streams using physical solvents.

2. Description of Prior Art

Processes utilizing physical solvents to remove acid gas constituents from a natural gas stream are well-known in the gas processing art. The physical solvents absorb the acid gas constituents, such as $CO_2$, $H_2S$ and other sulphur compounds, from the gas. The solvents containing the absorbed acid gas are then removed from the natural gas constituents herefrom, and the solvent stream is returned to contact the natural gas stream to re-absorb acid gas again.

Problems have been experienced, however, in utilizing a physical absorption process of this type with natural gases containing distillate because the distillate is absorbed by the physical solvent. The term distillate, as used herein, means heavier hydrocarbons of the molecular weight of pentane and higher.

The presence of a large portion of distillate in the physical solvent affects the ability of the solvent to absorb acid gas. The higher the concentration of retained distillate in the flashed solvent, the lower the ability of the diluted solvent to absorb acid gas. This lowered absorptive capacity requires higher solvent circulation rate, and increased absorption unit capital expense to absorb the same amount of acid gas. Additionally, the presence of distillate in the solvent increases the quantity of methane absorbed in the solvent. Methane, as well as ethane, butane and propane, are absorbed in the entrained distillate and are carried over to be flashed off with the acid gas in the flash unit. Any methane flashed in the acid gas recovery unit is lost and cannot be utilized for sales gas without further recovery operations.

Separation of the distillate from the physical solvent by fractional distillation is not possible, since a portion of the distillate has the same boiling range as the solvent in which it is entrained.

SUMMARY OF THE INVENTION

The invention is a method and apparatus for removing distillate from physical acid gas solvents. The method includes the steps of mixing water with a water soluble acid gas physical solvent containing distillate, holding the mixture to form an aqueous and an organic phase, separating the aqueous phase obtained in the mixing step which contains the solvent from the organic phase containing the distillate and separating the solvent from the water.

The addition of water to the solvent containing distillate results in a layering, or two phase liquid-liquid separation, the bottom layer of which is the physical solvent and water. The upper layer of the liquid is the organic layer containing the distillate which was formerly homogenously mixed with the solvent. The solvent and water are then separated by fractional distillation, and the solvent returned to the acid gas absorption installation.

BRIEF DESCRIPTION OF THE DRAWINGS

The inventor's presently preferred embodiment of the invention is shown in schematic form in the drawing.

DESCRIPTION OF THE PREFERRED EMBODIMENT

The inventor's preferred embodiment of the invention is shown in the drawing. In operation of the process, solvent from a natural gas treating plant, which has first been contacted with a natural gas stream to absorb acid gas constituents therefrom, then flashed to remove the low boiling constituents therefrom, enters the separation process from the left hand side of the drawing through a conduit 11. The physical solvent contains some distillate dissolved therein on entering conduit 11 and most of the acid gas physically absorbed from a natural gas stream (not shown) has previously been flashed from the solvent. The solvent next passes through heat exchanger 12 in which the solvent is heated by exiting regenerated solvent from line 30 to a temperature of about 150° F. The solvent then flows through line 13, wherein water is injected from line 20 and the mixture proceeds to mixer 14 wherein the water and solvent containing some distillate are intimately mixed. The mixed distillate, water, and solvent then flow through line 15 to a distillate separator 16 and the mixture is held there until a two phase separation occurs, distillate in the upper layer thereof and solvent and water in the lower layer.

The upper layer, or organic layer, containing distillate is then drawn off, or decanted, through a line 17 and into a lower portion of the distillate contactor 18. Water is added through a line 19 in an upper portion of distillate contactor 18 and trickles down through the packed column (not shown) in distillate contactor 18. Intermediate the distillate entry point from line 17 and the water entry point from line 19, a water level (not shown) is maintained within distillate contactor 18 so that the distillate entering through line 17 will percolate upward through the layer of standing water, continue its upward path through the packed column portion (not shown) of distillate contactor 18 and finally exit through line 21 to a storage area (not shown).

All but trace amounts of solvent are removed from the distillate layer within the distillate separator 16, and distillate contactor 18 removes the remaining traces of solvent from the distillate which is then taken to storage. Although the physical acid gas solvent is soluble in distillate, it is more soluble in water, and when washed or mixed with water the solvent will preferentially be dissolved in the aqueous phase. Standing water from the lower portion of the distillate contactor 18 is withdrawn through line 22, passed through pump 23, and returned through line 20 to be mixed with incoming solvent from heat exchanger 12.

The lower layer of liquid containing water and solvent in distillate separator 16 is withdrawn from a lower portion of distillate separator 16 and proceeds through line 24 through heat exchanger 25 wherein it is heated by the bottoms from the solvent still 26 prior to entering solvent still 26 through line 27.

Within solvent still 26, the mixture of water and physical solvent is fractionally distilled. Solvent still 26 may be of any standard design, and for a system of the size shown in Table I below, 10–15 trays are sufficient for adequate separation of the solvent and water. The bottoms of still 26 are the physical solvent, and the vapors drawn off the upper portion of still 26 are water vapor.

Heat for solvent still 26 is provided by a re-boiler 28 with appropriate conduits 31, 32 for extracting a portion of the liquid from the still and returning the heated liquid back to solvent still 26. The bottoms of solvent still 26, containing the fractionated physical solvent, are extracted from a lower portion of solvent still 26 by line 33, passed through pump 34, line 35 and heat exchanged in heat exchanger 25 with the separated solvent-water mixture from distillate separator 16. From heat exchanger 25, the regenerated solvent is returned by way of line 30 heat exchanger 12 and line 36 to the acid gas removal plant (not shown).

Water vapor leaving solvent still 26 through line 37 is condensed at heat exchanger 38 and flowed into a reflux accumulator 29. Makeup water from line 40 may be added to reflux accumulator 29 to replace losses occuring during the various plant operations. Any water vapor not condensed at heat exchanger 38 or reflux accumulator 39 is then removed by appropriate pumping means 41, such as a jet adductor or compressor, and vented to the atmosphere. Water accumulated in reflux accumulator 39 exits a lower portion thereof through line 42, passes through pump 43 and line 44 to enter an upper portion of solvent still 26 through line 45 as reflux. The major portion of water flowed through 44, however, continues through line 46 through heat exchanger 47 and line 19 to distillate contactor 18.

A material balance for a 145 gallon per minute plant total solvent flow is given below in Table I at the cited points in the system in gallons per minute, with the temperatures and pressures at those points given in degrees F and pounds per square inch absolute, respectively.

TABLE I

|  | Stream number | | | | | | | |
| --- | --- | --- | --- | --- | --- | --- | --- | --- |
|  | 11 | 20 | 17 | 21 | 24 | 44 | 45 | 33 |
| Flow (GPM) of: | | | | | | | | |
| Distillate | | 7 | | 7 | 7 | | | |
| Water | | | 30 | | | 30 | 33 | 3 | Trace |
| Solvent | 138 | Trace | Trace | | 138 | | | 138 |
| Total Flow (GPM) | 145 | 30 | 7 | 7 | 168 | 33 | 3 | 138 |
| Temperature (°F) | 45 | 130 | 160 | 130 | 160 | 165 | 165 | 295 |
| Pressure (PSIA) | 60 | 45 | 40 | 37 | 40 | 45 | 7 | 7 |

The parameters given in Table I are merely for illustrative purposes. Parameters may vary depending upon the operating temperature of the acid gas extraction unit from which the solvent flows to the present process, upon the particular type of solvent being process, and the pressures which are found to be most efficient for the particular embodiment of the invention. For example, solvent still 26 may be operated at a higher pressure with resultant increase in the bottoms temperature for line 33. However, the lower the pressure at which the solvent still 26 is operated, the less degradation that will occur to the solvent during the fractional distillation thereof. It has also been found that distillate separator 16 and distillate contactor 18 may be operated at temperatures from ambient to 200°F. with no appreciable loss of efficiency for the overall process. Reflux accumulator 39 may also be operated at temperatures between ambient and 200° the optimum temperature and pressure being dictated by the operating temperature of the solvent still, the particular solvent used, and considerations of thermodynamic efficiency.

Examples of the physical solvents capable of absorbing acid gas constituents include the dimethyl ethers of diethylene glycol, triethylene glycol, tretraethylene glycol, pentaethylene glycol, hexaethylene glycol, heptaethylene glycol, and polyethylene glycol, as well as solvents such as N-methyl-2 pyrrolidone, propylene carbonate and methyl cyano acetate. This enumeration of specific solvents is not meant to limit the scope of the invention, and any water soluble physical solvent which possess good acid gas absorption characteristics would perform satisfactorily in the process of the invention.

In most plants utilizing the invention, only a small portion of the flow of solvent containing some distillate contaminant will need to be treated by the present invention to adequately control build-up of distillate therein. For example, a gas treating plant with an inlet gas volume of 275 MMSCF/day of natural gas containing 42 percent carbon dioxide was operated to reduce the carbon dioxide content in the sales gas to 3.5 percent. The present invention was utilized with a process having only 3 percent of the total solvent circulation from the acid gas extraction plan passing therethrough. Without the benefit of the present invention, distillate concentration in the solvent reached a concentration of 30 percent. With the desired embodiment of the invention in operation, the concentration of distillate in the solvent stream never rose above 5 percent.

Thus it can be seen that an improved apparatus and method for removing distillate from physical acid gas solvents has been shown. Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of equipment. For example, equivalent elements or materials may be substituted for those illustrated and described herein, steps may be reversed, and certain features of the invention may be utilized independently of the use of other features, all as would be apparent to one skilled in the art after having the benefit of this description of the invention.

I claim:

1. In an acid gas removal process, the combination of steps comprising:
   contacting a gas stream containing acid gas and some organic distillate with a hydrophyllic physical solvent to absorb the acid gas constituents;
   flashing the acid gas constituents from said solvent;
   adding water to said solvent containing distillate;
   holding said mixture of water and solvent in a quiescent state to form an aqueous phase containing said solvent and an organic phase containing said distillate;

separating said aqueous phase from the organic phase;

and, separating said solvent and water.

2. The process as claimed in claim 1, including the additional step of:

returning said solvent to contact said gas stream.

3. The process as claimed in claim 1 wherein said separating steps together include:

decanting said organic phase from said aqueous phase;

and, fractionally distilling said aqueous phase to separate said solvent from said water.

4. The process as claimed in claim 1 wherein said adding step includes:

adding water to about 0.1 to about 10 percent by volume of the total amount of said physical solvent passing from said contacting step.

* * * * *